US011823720B2

(12) United States Patent
Kaneko et al.

(10) Patent No.: US 11,823,720 B2
(45) Date of Patent: Nov. 21, 2023

(54) VOICE COIL MOTOR YOKE WITH ANNULAR GROOVE IN MAGNET BONDING REGION AND VOICE COIL MOTOR INCLUDING SAME

(71) Applicant: SHIN-ETSU CHEMICAL CO., LTD., Tokyo (JP)

(72) Inventors: Masaki Kaneko, Echizen (JP); Keisuke Watarai, Tokyo (JP); Takuya Tamamura, Tokyo (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 18/047,898

(22) Filed: Oct. 19, 2022

(65) Prior Publication Data

US 2023/0141116 A1 May 11, 2023

(30) Foreign Application Priority Data

Nov. 8, 2021 (JP) ................................. 2021-181895

(51) Int. Cl.
   *G11B 5/55* (2006.01)
   *G11B 21/08* (2006.01)
   *H02K 41/035* (2006.01)

(52) U.S. Cl.
   CPC .......... *G11B 5/5569* (2013.01); *G11B 5/5521* (2013.01); *G11B 21/08* (2013.01); *H02K 41/0358* (2013.01); *H02K 41/0356* (2013.01)

(58) Field of Classification Search
   None
   See application file for complete search history.

(56) References Cited

U.S. PATENT DOCUMENTS

| | | | | |
|---|---|---|---|---|
| 4,692,999 A | * | 9/1987 | Frandsen | G11B 5/5521 310/13 |
| 5,267,111 A | * | 11/1993 | Nishimura et al. | G11B 5/5521 360/266.7 |
| 5,459,359 A | * | 10/1995 | Umehara | G11B 5/5521 360/264.7 |
| 5,822,156 A | * | 10/1998 | Suzuki et al. | G11B 5/5521 360/264.9 |
| 6,664,663 B1 | * | 12/2003 | Yeo | G11B 25/043 360/264.9 |
| 8,958,179 B1 | | 2/2015 | Ueha et al. | |
| 2006/0268451 A1 | | 11/2006 | Kikuchi | |

FOREIGN PATENT DOCUMENTS

JP 2006331545 A 12/2006
JP 2015130224 A 7/2015

* cited by examiner

*Primary Examiner* — Craig A. Renner
(74) *Attorney, Agent, or Firm* — Myers Bigel, P.A.

(57) ABSTRACT

A voice coil motor yoke having a magnet bonding surface includes an annular groove inside a bonding region on the magnet bonding surface, the bonding region having substantially the same shape as a contour of a magnet to be bonded on the magnet bonding surface of the yoke. A region surrounded by the annular groove on the magnet bonding surface is an adhesive application region. A voice coil motor includes: a pair of the voice coil motor yokes; an adhesive applied to the adhesive application region of each of the pair of yokes; and a pair of rare earth magnets bonded via the adhesive to the bonding region of each of the pair of yokes.

6 Claims, 4 Drawing Sheets

VOICE COIL MOTOR YOKE WITH ANNULAR GROOVE IN MAGNET BONDING REGION AND VOICE COIL MOTOR INCLUDING SAME

CROSS-REFERENCE TO RELATED APPLICATION

This application claims priority from Japanese Patent Application No. 2021-181895 filed Nov. 8, 2021, which is incorporated herein by reference in its entirety.

BACKGROUND OF THE INVENTION

The present invention relates to a voice coil motor yoke and to a voice coil motor for a hard disk drive.

A voice coil motor (hereinafter referred to as VCM) is a magnetic circuit component used to drive an actuator in a hard disk drive (hereinafter referred to as HDD). In general, while an HDD is in operation, when a current flows through a coil installed in the actuator, the actuator moves to a specific position on a disk due to Lorentz force to read and write data on the magnetic disk by using a head at the tip of the actuator.

As described in JP 2006-331545 A, it is known that an HDD develops resonance when the natural resonant frequencies of HDD components come close to each other, thus causing quality problems such as vibrations and noise. Particularly in the case of a VCM, as described in JP 2015-130224 A, when the natural frequency of the VCM matches or is close to the natural frequency of an HDD component other than the VCM, then resonance will occur and the actuator will vibrate. This tends to cause problems such as adversely affecting disk read/write operations and generating noise. In order to reduce such problems, it has conventionally been common practice to design the components in an HDD such that the natural frequencies of the components do not match or are not close to each other.

SUMMARY OF THE INVENTION

In general, a VCM is constructed of a pair of yokes, arc-shaped magnets bonded to the inner surfaces of the yokes, and pins that fix the yokes together, maintaining a gap between the magnets. The magnets are bonded to the yokes with an adhesive. In the process of attaching the magnets to the yokes, the adhesive is applied to the yokes or the magnets, or both, and then the two are brought into contact and bonded. The inventors of the present application have found that, at this time, when the application area of the adhesive that bonds the magnet and the yoke is large, then the natural resonant frequency of an assembled VCM is high, and when the application area of the adhesive is small, then the natural resonant frequency is low. However, it has been difficult to control the application area of an adhesive due to variable spread of the adhesive caused by variations in the flatness of the yokes and the amount of an adhesive, and it has been therefore difficult to stabilize the natural resonant frequency of the VCM.

The present invention has been made in view of the afore-described problem, and an object of the invention is to provide a voice coil motor yoke and a voice coil motor that can stabilize the natural resonant frequency of a voice coil motor and facilitate the mass production of the voice coil motor.

In order to achieve the above-described object, one aspect of the present invention is a voice coil motor yoke having a magnet bonding surface, including an annular groove inside a bonding region on the magnet bonding surface, the bonding region having substantially the same shape as a contour of a magnet to be bonded on the magnet bonding surface, and a region surrounded by the annular groove on the magnet bonding surface being an adhesive application region.

The annular shape of the annular groove may be substantially similar to the contour of a magnet.

The annular groove may be formed continuously or intermittently in a circumferential direction.

Another aspect of the present invention is a voice coil motor including: a pair of the voice coil motor yokes described above; an adhesive applied to the adhesive application region of each of the pair of yokes; and a pair of rare earth magnets bonded via the adhesive to the bonding region of each of the pair of yokes.

According to the present invention, the annular groove is provided in the magnet bonding surface of each of the yokes in such a manner as to surround the region to which an adhesive is to be applied, and the region surrounded by the annular groove is defined as an adhesive application region. This makes it possible to reduce variations in the area where an adhesive is applied, stabilize the natural resonant frequency of a VCM, and facilitate control and mass production of a VCM having a stable natural resonant frequency, thus enabling the occurrence of the resonance of an HDD to be reduced and the yield of the HDD to be improved.

DESCRIPTION OF PREFERRED EMBODIMENTS

The following will describe an embodiment of a voice coil motor yoke and a voice coil motor according to the present invention with reference to the accompanying drawings.

Figure 1:
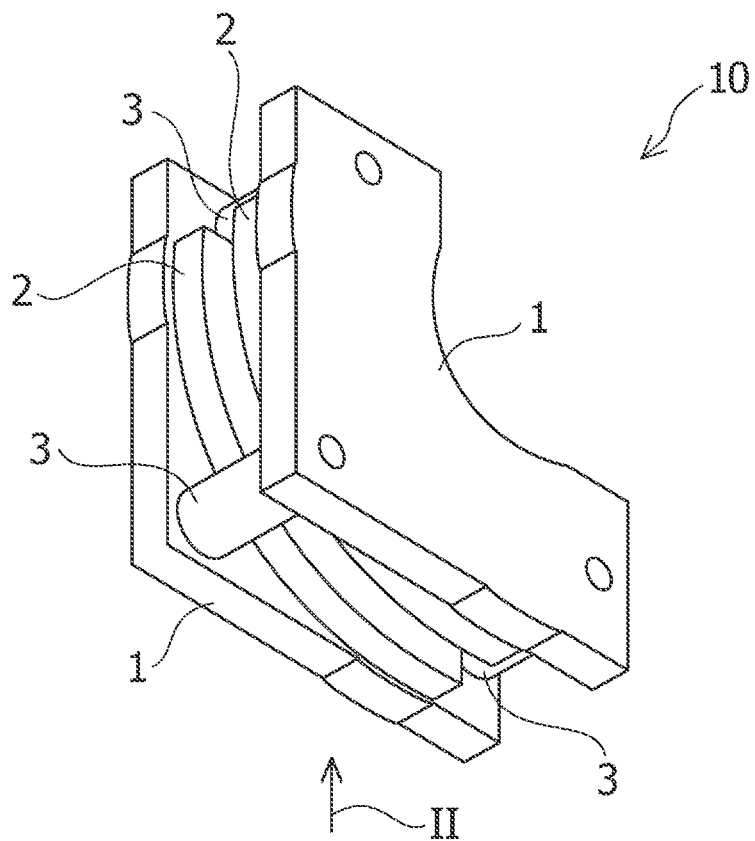
FIG. 1 is a schematic perspective view illustrating an embodiment of a VCM according to the present invention.
Figure 2:
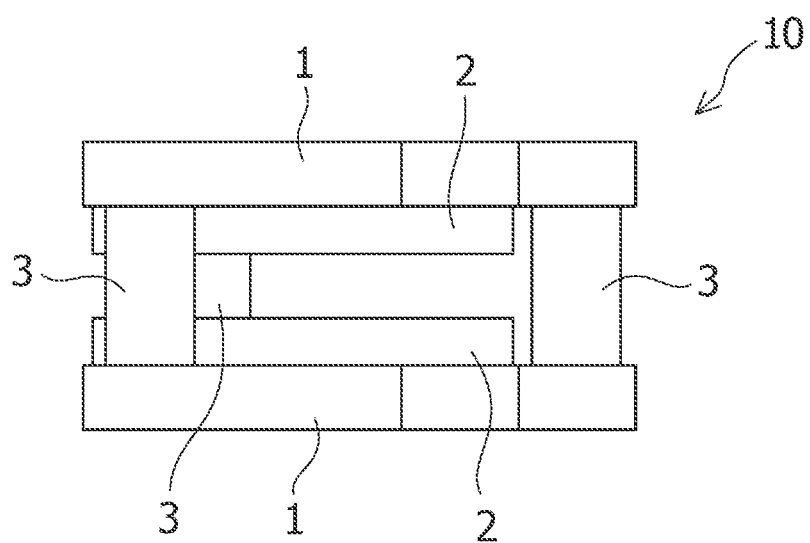
FIG. 2 is a schematic front view of the VCM of FIG. 1 observed from arrow II.

As illustrated in FIG. 1 and FIG. 2, a VCM 10 of the present embodiment is constructed mainly of a pair of yokes 1, a pair of arc-shaped magnets 2, each of which is bonded to the inner surface of each of the yokes 1, and pins 3 that fix the pair of yokes 1 together such that the pair of magnets 2 are sandwiched with a gap maintained between the pair of magnets 2. Although FIG. 1 and FIG. 2 illustrate each of the entire yokes 1 as a flat plate, the yoke 1 may have an undulation or a step on a part of the outer peripheral portion of the surface to which the magnet 2 is bonded.

Figure 3:
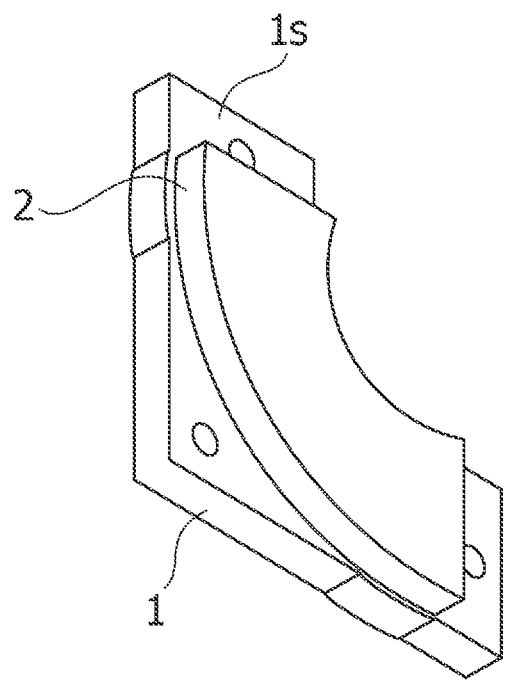
FIG. 3 is a schematic perspective view illustrating a yoke and a magnet from the VCM of FIG. 1 that has been disassembled.

The material composing the yokes 1 is generally a cold-rolled steel plate (SPCC) material, but it is not particularly limited thereto. Furthermore, the magnets 2 are generally nickel-plated rare earth sintered magnets, but they are not particularly limited thereto. Furthermore, referring to FIG. 3 illustrating the VCM 10 that has been disassembled, the magnet 2 is attached to a magnet bonding surface 1s, which is the inner surface of the yoke 1, with an adhesive (not illustrated).

Although the adhesive is not particularly limited, a low outgas adhesive is used so as to prevent foreign matter from adhering to an actuator and the like. For example, an acryl-based or epoxy-based adhesive is used. The amount of an adhesive to be applied is not particularly limited, and can be appropriately selected according to a design. Generally, considering the viscosity and adhesive strength of an adhesive, an amount of the adhesive is applied such that the magnet 2 does not separate from the yoke 1 even when subjected to a certain amount of shearing force and the adhesive does not spread beyond the magnet 2.

Figure 4:
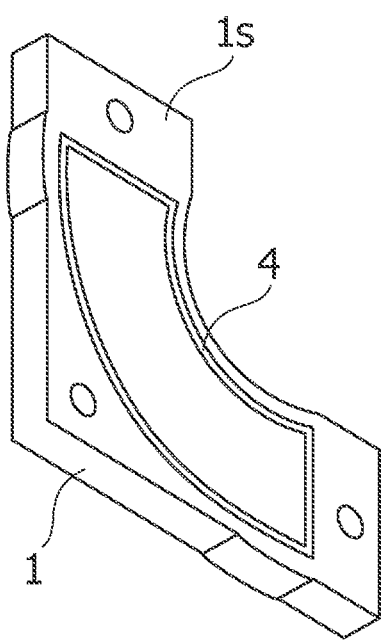
FIG. 4 is a schematic perspective view illustrating the yoke from the VCM of FIG. 1 that has been disassembled.
Figure 5:
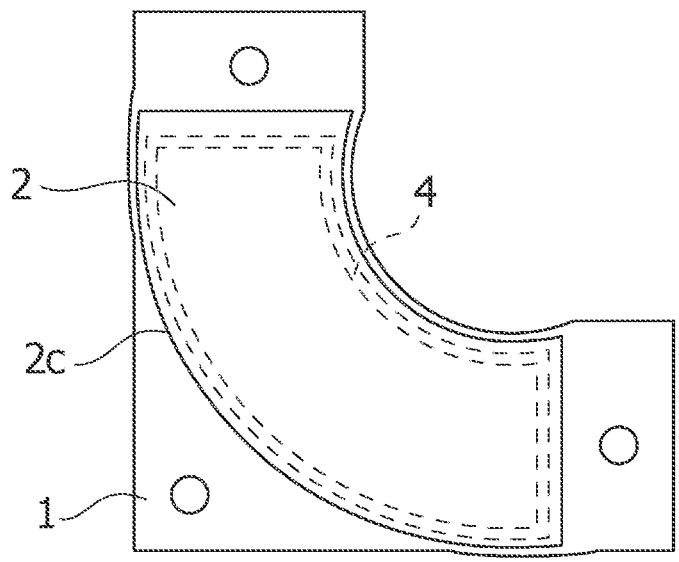
FIG. 5 is a schematic plan view illustrating the yoke and the magnet from the VCM of FIG. 1 that has been disassembled.

Referring to FIG. 4 illustrating the magnet 2 further disassembled from the yoke 1 in the VCM 10 of the present embodiment, an annular groove 4 is provided inside the magnet bonding surface 1s of the yoke 1. The annular groove 4 is positioned inside the bonding region having substantially the same shape as the contour of the magnet 2 to be attached to the magnet bonding surface 1s of the yoke 1. For example, as illustrated in FIG. 5, in the plan view illustrating the magnet 2 attached to the magnet bonding surface 1s of the yoke 1, the annular groove 4 indicated by the dashed lines is positioned inside a contour of the magnet 2, i.e., the bonding region 2c of the magnet 2. Furthermore, as illustrated in FIG. 6, in the plan view illustrating a state in which the magnet 2 has been disassembled from the yoke 1, the region surrounded by the annular groove 4 in the magnet bonding surface is of the yoke 1 is defined as an adhesive application region 5 where an adhesive is applied.

Figure 6:
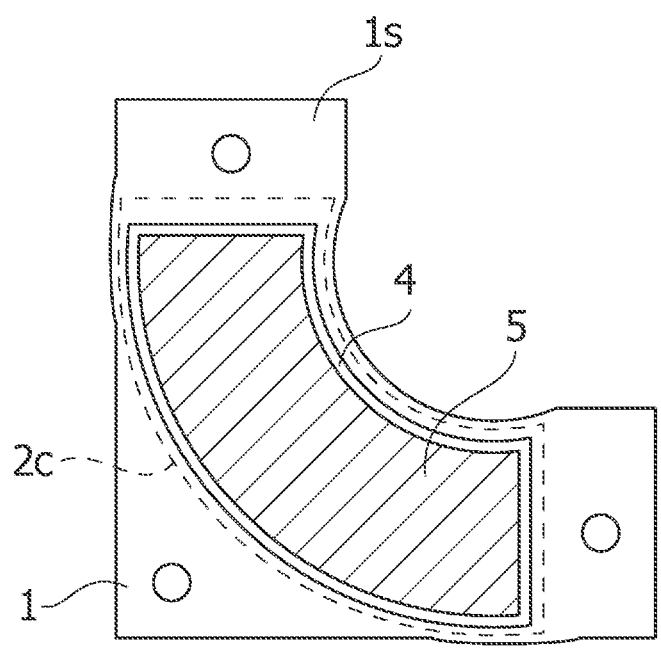
FIG. 6 is a schematic plan view illustrating the yoke from the VCM of FIG. 1 that has been disassembled.
Figure 7:
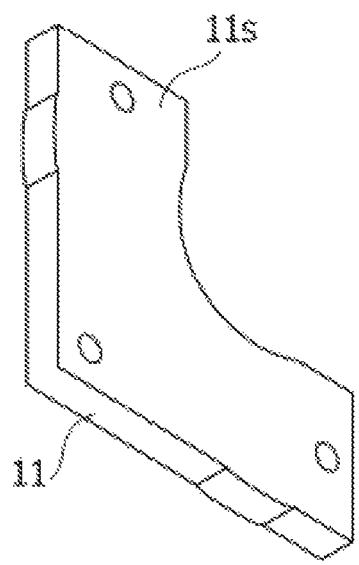
FIG. 7 is a schematic perspective view illustrating a conventional yoke.

In contrast to a conventional yoke 11 without a groove as illustrated in FIG. 7, in which a difference in the amount of an adhesive results in variations in how the adhesive spreads when the adhesive is applied to the magnet bonding surface 11s, thus making it difficult to obtain a constant adhesive application area, the present embodiment having the afore-described configuration can obtain a stable adhesive application area by trapping an excess adhesive by the annular groove 4 as illustrated in FIG. 6, thereby preventing the adhesive from spreading outward beyond the annular groove 4 surrounding the adhesive application region 5 even if an excessive amount of the adhesive is applied to the adhesive application region 5 and the magnet 2 is placed in the bonding region 2c of the magnet. This makes it possible to suppress the fluctuation of the natural resonant frequency of the VCM 10 so as to reduce the resonance of an HDD.

Furthermore, it is possible to prevent an adhesive from spreading from the magnet 2 by providing the annular groove 4 inside the bonding region 2c of a magnet in the magnet bonding surface 1s of the yoke 1. The annular groove 4 is preferably provided such that the annular groove 4 is smaller than the contour of the bonding region 2c of a magnet by, for example, 0.5 mm or more, and more preferably smaller by 0.7 mm or more. On the other hand, the lower limit of a position where the annular groove 4 is provided is not particularly limited, and may be appropriately set to the extent that the adhesive application region 5 does not become too small from the viewpoint of maintaining adhesive strength (e.g., the area of the adhesive application region 5 is approximately 20% or more of the area of the bonding region 2c of a magnet).

FIG. 4 to FIG. 6 illustrate the case in which the shape of the adhesive application region 5 surrounded by the annular groove 4 is substantially similar to the shape of the bonding region 2c of a magnet from the viewpoint of further securely bonding and fixing the magnet 2 onto the yoke 1; however, the present invention is not limited thereto, and the shape of the adhesive application region 5 may be, for example, bean-shaped, elliptical, arcuate, or the like.

Furthermore, FIG. 4 and FIG. 6 illustrate the case in which the annular groove 4 is continuously provided in the circumferential direction, but the present invention is not limited thereto, and the annular groove 4 may alternatively be provided intermittently in the circumferential direction. When the annular groove 4 is intermittently provided in the circumferential direction, the intermittent portions preferably have small lengths in the circumferential direction of the annular groove 4 and are preferably provided at one to a few locations so as to prevent an adhesive from spreading beyond the adhesive application region 5.

The depth of the annular groove 4 is not particularly limited, and it can be appropriately selected according to the design of the VCM 10 to the extent that an adhesive can be trapped, and is preferably set to, for example, 0.05 to 0.3 mm and more preferably 0.1 to 0.3 mm. Similarly, the width of the annular groove 4 is preferably set to, for example, 0.5 to 1.5 mm. The annular groove 4 can be easily formed using any known processing apparatus capable of processing the yoke 1.

The amount of an adhesive to be applied can be appropriately set as described above, but if the amount of an adhesive applied is extremely small, then the adhesive may not be trapped by the annular groove 4, leading to an unstable application area of the adhesive inside the adhesive application region 5. Furthermore, the way the adhesive spreads is also influenced by the flatness of the magnet bonding surface is of the yoke 1. Preferably, therefore, an approximate application amount of the adhesive that causes the adhesive to be trapped by the annular groove 4 is experimentally determined in advance. The flatness of the magnet bonding surface is of the yoke 1 is preferably improved, which makes it easy to know the extent to which the adhesive will spread when applied.

EXAMPLES

The following will describe examples and comparative examples to explain the present invention in further detail, but the present invention is not limited thereto.

A bonding region having substantially the same shape as the contour of a magnet to be attached was defined on the magnet bonding surface of each of a pair of yokes, which are made of an SPCC material, of a commercially available VCM, an annular groove having a shape substantially similar to the contour of the magnet and having a depth of 0.1 mm and a width of 1.0 mm was provided 0.7 mm inward from the periphery of the bonding region, and the yoke surface surrounded by the groove was defined as the adhesive application region. An adhesive in a predetermined application amount was applied to the adhesive application region, and Examples 1 to 5 were prepared by applying different amounts of the adhesive. In addition, for the purpose of comparison, Comparative Examples 1 to 5 not provided with the grooves in the yokes were prepared by applying the same amounts of the adhesive as those of the Examples.

Then, magnets were attached to the yokes of each of the Examples and the Comparative Examples to fabricate the VCMs. The VCMs were installed to HDD bases and vibrated by applying currents to actuators, and the vibration frequency of each VCM was measured using a laser Doppler vibrometer (model No. PSV-400, Polytec). The results are shown in Table 1 and FIG. 8.

Figure 8:
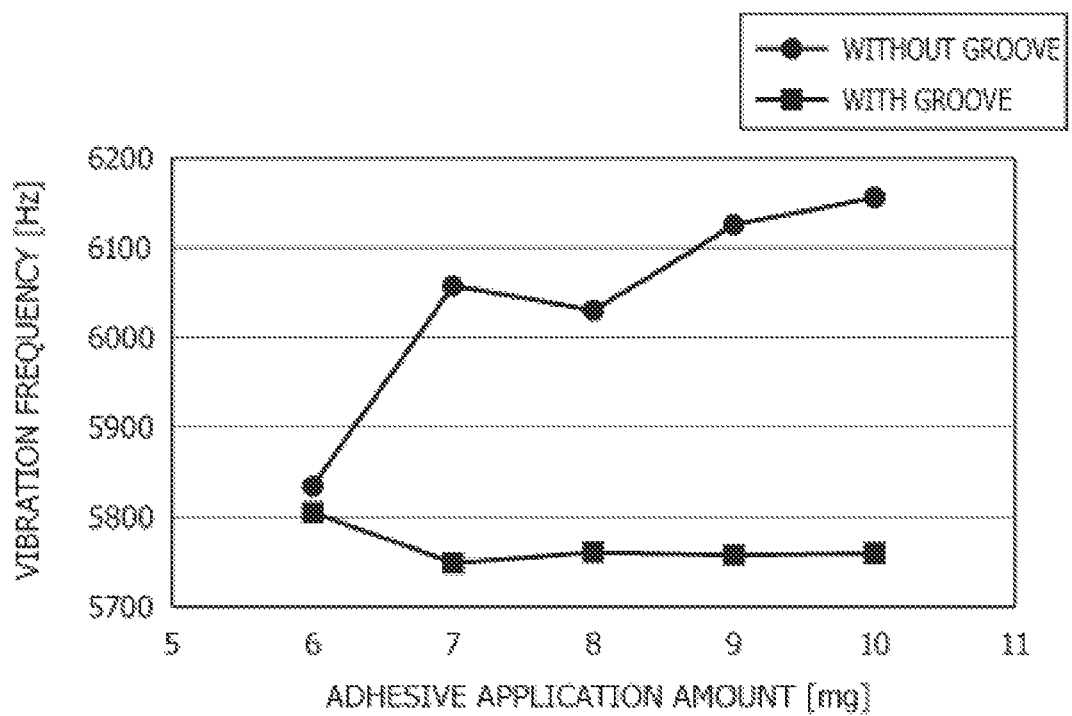
FIG. 8 is a graph showing the results of experiments using the yokes of Examples 1 to 5 and Comparative Examples 1 to 5, the graph showing the vibration frequencies of VCMs versus the amounts of an adhesive applied.

As shown in Table 1 and FIG. 8, as the application amount of the adhesive increased, the vibration frequencies of the VCMs using the yokes of Comparative Examples 1 to 5 without the grooves tended to also increase, whereas no tendency of increase in vibration frequencies was observed in the VCMs using the yokes of Examples 1 to 5 with the grooves. Thus, it was found that the VCMs using the yokes of Examples 1 to 5 with the annular grooves suppressed changes in vibration frequency in response to an increase or decrease in the adhesive.

TABLE 1

| | Adhesive application amount [mg] | | Average application amount [mg] | Vibration frequency [Hz] | |
|---|---|---|---|---|---|
| | Upper yoke | Lower yoke | | Without groove | With groove |
| 1 | 5.5 | 6.5 | 6 | 5835 | 5805 |
| 2 | 6.5 | 7.5 | 7 | 6058 | 5750 |
| 3 | 7.5 | 8.5 | 8 | 6030 | 5760 |
| 4 | 8.5 | 9.5 | 9 | 6125 | 5758 |
| 5 | 9.5 | 10.5 | 10 | 6155 | 5760 |

Furthermore, twenty-five yokes were prepared under the same conditions as in Example 1 and Comparative Example 1, and the vibration frequencies of the VCMs were measured in the same manner as described above, the results of which are shown in Table 2. Observing the range from the minimum value to the maximum value of the vibration frequency, it was found that the range was small in the case of the same conditions as in Example 1, and the standard deviation was also small in Example 1. Thus, it was found that the VCMs using the yokes of Examples 1 to 5 provided with the annular grooves stabilized the variations in vibration frequency.

TABLE 2

| Data on 25 pieces of same conditions as in Example 1 and Comparative Example 1 | Vibration frequency [Hz] | |
|---|---|---|
| | Without groove | With groove |
| Average value | 5931 | 5725 |
| Maximum value | 6075 | 5913 |
| Minimum value | 5663 | 5650 |
| Range | 413 | 263 |
| Standard deviation | 132 | 65 |

What is claimed is:

1. A voice coil motor yoke having a substantially flat plate-shape and having a magnet bonding surface, comprising an annular groove inside a bonding region on the magnet bonding surface, wherein the bonding region has substantially the same shape as a contour of a magnet to be bonded on the magnet bonding surface, and a region surrounded by the annular groove on the magnet bonding surface is an adhesive application region.

2. The voice coil motor yoke according to claim 1, wherein an annular shape of the annular groove is substantially similar to the contour of a magnet.

3. The voice coil motor yoke according to claim 1, wherein the annular groove is formed continuously or intermittently in a circumferential direction.

4. A voice coil motor comprising:
a pair of voice coil motor yokes, each voice coil motor yoke having a magnet bonding surface and comprising an annular groove inside a bonding region on the magnet bonding surface, wherein the bonding region has substantially the same shape as a contour of a magnet to be bonded on the magnet bonding surface, and a region surrounded by the annular groove on the magnet bonding surface is an adhesive application region;
an adhesive applied to the adhesive application region of each of the pair of yokes; and
a pair of rare earth magnets bonded via the adhesive to the bonding region of each of the pair of yokes.

5. The voice coil motor according to claim 4, wherein an annular shape of the annular groove is substantially similar to the contour of a magnet.

6. The voice coil motor according to claim 4, wherein the annular groove is formed continuously or intermittently in a circumferential direction.

* * * * *

UNITED STATES PATENT AND TRADEMARK OFFICE
CERTIFICATE OF CORRECTION

PATENT NO. : 11,823,720 B2
APPLICATION NO. : 18/047898
DATED : November 21, 2023
INVENTOR(S) : Kaneko et al.

It is certified that error appears in the above-identified patent and that said Letters Patent is hereby corrected as shown below:

In the Specification

Column 3, Line 38: Please correct "surface is" to read --surface 1s--

Column 3, Line 44: Please correct "11s" to read --1s--

Column 4, Line 41: Please correct "is" to read --1s--

Column 4, Line 45: Please correct "surface is" to read --surface 1s--

Signed and Sealed this
Twenty-third Day of April, 2024

Katherine Kelly Vidal
*Director of the United States Patent and Trademark Office*